United States Patent
Belelie et al.

(10) Patent No.: US 8,833,917 B2
(45) Date of Patent: *Sep. 16, 2014

(54) SOLID INK COMPOSITIONS COMPRISING CRYSTALLINE-AMORPHOUS MIXTURES

(75) Inventors: Jennifer L. Belelie, Oakville (CA);
Peter G. Odell, Mississauga (CA);
Stephan V. Drappel, Toronto (CA);
Kentaro Morimitsu, Mississauga (CA);
Naveen Chopra, Oakville (CA); Corey Tracy, Mississauga (CA); Jule W. Thomas, Jr., West Linn, OR (US);
Jeffrey H. Banning, Hillsboro, OR (US); Paul J. McConville, Webster, NY (US); Joanne L. Lee, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 694 days.

This patent is subject to a terminal disclaimer.

(21) Appl. No.: 13/095,681

(22) Filed: Apr. 27, 2011

(65) Prior Publication Data
US 2012/0274700 A1 Nov. 1, 2012

(51) Int. Cl.
C09D 11/00 (2014.01)
C09D 11/34 (2014.01)
C09D 11/38 (2014.01)

(52) U.S. Cl.
CPC ............... *C09D 11/34* (2013.01); *C09D 11/38* (2013.01)
USPC ...................................................... 347/100

(58) Field of Classification Search
USPC ...................................................... 347/100
See application file for complete search history.

(56) References Cited

U.S. PATENT DOCUMENTS

| | | |
|---|---|---|
| 4,490,731 A | 12/1984 | Vaught |
| 5,195,430 A | 3/1993 | Rise |
| 5,231,135 A | 7/1993 | Machell et al. |
| 5,389,958 A | 2/1995 | Bui et al. |
| 5,621,022 A | 4/1997 | Jaeger et al. |
| 6,071,986 A | 6/2000 | Everhardus et al. |
| 6,221,137 B1 | 4/2001 | King et al. |
| 6,280,510 B1 | 8/2001 | Kelderman et al. |
| 6,471,758 B1 | 10/2002 | Kelderman et al. |
| 6,472,523 B1 | 10/2002 | Banning et al. |
| 6,476,219 B1 | 11/2002 | Duff et al. |
| 6,576,747 B1 | 6/2003 | Carlini et al. |
| 6,576,748 B1 | 6/2003 | Carlini et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,682,587 B2 | 1/2004 | Hendricks et al. |
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,958,406 B2 | 10/2005 | Banning et al. |
| 7,053,227 B2 | 5/2006 | Jaeger et al. |

(Continued)

*Primary Examiner* — Laura Martin
(74) *Attorney, Agent, or Firm* — Pillsbury Winthrop Shaw Pittman LLP

(57) ABSTRACT

A solid ink composition comprising an amorphous component, a crystalline material, and optionally, a colorant, which are suitable for ink jet printing, including printing on coated paper substrates. In embodiments, the solid ink formulation comprises a blend of amorphous and crystalline components which provides a solid ink with excellent rheological properties and robustness when forming images or printing on coated paper substrates.

20 Claims, 5 Drawing Sheets

(56) References Cited

U.S. PATENT DOCUMENTS

| | | |
|---|---|---|
| 7,084,190 B2 | 8/2006 | Everhardus et al. |
| 7,381,831 B1 | 6/2008 | Banning et al. |
| 7,427,323 B1 | 9/2008 | Birau et al. |
| 8,328,924 B2 * | 12/2012 | Morimitsu et al. ........ 106/31.29 |
| 8,372,189 B2 * | 2/2013 | Chopra et al. ............. 106/31.29 |
| 8,506,040 B2 * | 8/2013 | Belelie et al. .................... 347/20 |
| 2009/0223409 A1 * | 9/2009 | Banning et al. ............ 106/31.13 |

* cited by examiner

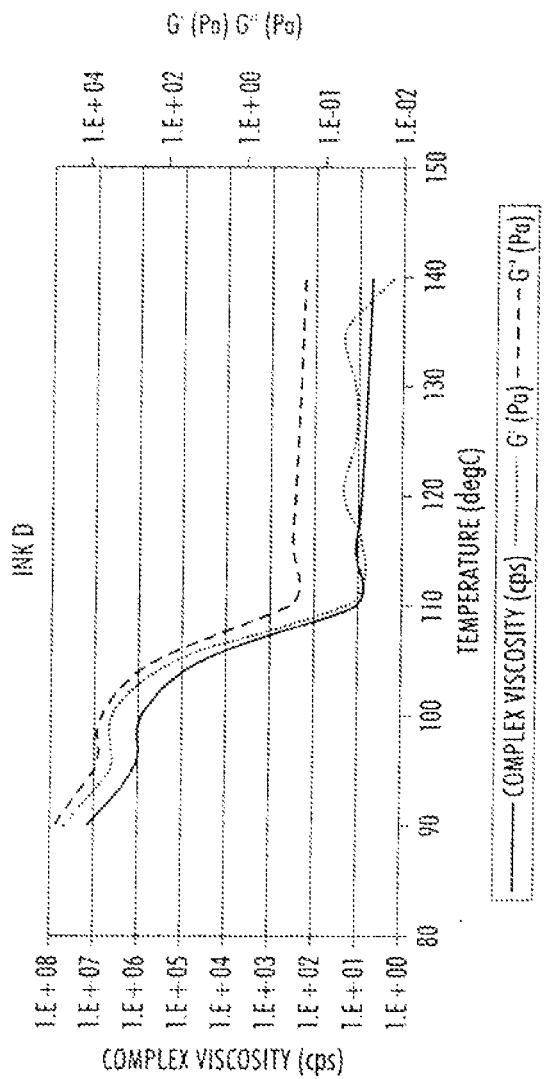

SOLID INK COMPOSITIONS COMPRISING CRYSTALLINE-AMORPHOUS MIXTURES

CROSS-REFERENCE TO RELATED APPLICATIONS

Reference is made to commonly owned and co-pending, U.S. patent application Ser. No. 13,095,784 entitled "Solid Ink Compositions Comprising Amorphous Esters of Tartaric Acid" to Kentaro Morimitsu et al., electronically filed on the same day herewith U.S. patent application Ser. No. 13,095,715 entitled"Solid Ink Compositions Comprising Crystalline Esters of Tartaric Acid" to Kentaro Morimitsu et al., electronically filed on the same day herewith; U.S. patent application Ser. No. 13,095,770 entitled "Phase Change Inks and Methods of Making the Same" to Kentaro Morimitsu et al., electronically filed on the same day herewith; U.S. patent application Ser. No. 13,095,591 entitled "Phase Change Ink Components and Methods of Making the Same" to Jennifer Belelie et al., electronically filed on the same day herewith ; U.S. patent application Ser. No. 13,095,555 entitled "Phase Change Inks and Methods of Making the Same" to Naveen Chopra et al., electronically filed on the same day herewith ; U.S. patent application Ser. No. 13,095,636 entitled "Solid Ink Compositions Comprising Crystalline-Amorphous Mixtures" to Jennifer Belelie et al., electronically filed on the same day herewith ; and U.S. patent application Serial No. 13,095,795 entitled "Solid Ink Compositions Comprising Amorphous Esters of Citric Acid" to Kentaro Morimitsu et al., electronically filed on the same day herewith; U.S. patent application Ser. No. 13,095,038 entitled "Print Process for Phase Separation Ink" to Paul McConville et al., electronically filed on the same day herewith; U.S. patent application Ser. No. 13,095,015 entitled "Solventless Reaction Process" to Thomas Edward Enright et al., electronically filed on the same day herewith; U.S. patent application Ser. No. 13,095,028 entitled "Phase Change Ink" to Kentaro Morimitsu et al., electronically filed on the same day herewith ; U.S. patent application Ser. No. 13,095,174 entitled "Next-Generation Solid Inks From Novel Oxazoline Components, Developed for Robust Direct-to-Paper Printing" to Rina Carlini et al., electronically filed on the same day herewith; and U.S. patent application Ser. No. 13,095,221 entitled"Novel Components for a Next-Generation Robust Solid Ink" to Rina Carlini et al., electronically filed on the same day herewith; and U.S. patent application Ser. No. 13,095,043 entitled "Phase Separation Ink" to Peter G. Odell et al., electronically filed on the same day herewith, The entire disclosures of which are incorporated herein by reference in its entirety.

BACKGROUND

The present embodiments relate to solid ink compositions characterized by being solid at room temperature and molten at an elevated temperature at which the molten ink is applied to a substrate. These solid ink compositions can be used for ink jet printing. The present embodiments are directed to a novel solid ink composition comprising an amorphous component, a crystalline material, and optionally a colorant, and methods of making the same.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing solid ink for printing on a recording medium such as paper. In thermal ink jet printing processes employing hot melt inks, the solid ink is melted by the heater in the printing apparatus and utilized (jetted) as a liquid in a manner similar to that of conventional thermal ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional solid ink technology is generally successful in producing vivid images and providing economy of jet use and substrate latitude on porous papers, such technology has not been satisfactory for coated paper. Thus, while known compositions and processes are suitable for their intended purposes, a need remains for additional means for forming images or printing on coated paper substrates. As such, there is a need to find alternative compositions to provide customers with excellent image robustness on all substrates.

Each of the foregoing U.S. Patents and Patent Publications are incorporated by reference herein. Further, the appropriate components and process aspects of the each of the foregoing U.S. Patents and Patent Publications may be selected for the present disclosure in embodiments thereof.

SUMMARY

According to embodiments illustrated herein, there is provided novel solid ink compositions comprising a mixture of crystalline and amorphous components that exhibit excellent robustness for ink jet printing, including printing on coated paper substrates.

In particular, the present embodiments provide a phase change ink comprising at least a crystalline component having a viscosity of less than 10 cps at about 140° C. and a viscosity of greater than $1 \times 10^6$ cps at room temperature; and at least an amorphous component having a viscosity of less than 100 cps at about 140° C. and a viscosity of greater than $1 \times 10^6$ cps at room temperature, wherein the phase change ink has a viscosity of less than 12 cps at about 140° C. and a viscosity of at least $10^6$ cps at room temperature.

In further embodiments, there is provided a phase change ink comprising at least a crystalline component; and at least an amorphous component, wherein the phase change ink has a viscosity of less than about 12 cps at a temperature of about 140° C. and a viscosity of at least about $10^6$ cps at room temperature.

In yet other embodiments, there is provided a method of printing, comprising incorporating a phase change ink into an ink jet printing apparatus, wherein the phase change ink comprises at least a crystalline component, and at least an amorphous component, wherein the phase change ink has a viscosity less than about 12 cps at a temperature of about 140° C. and a viscosity of at least about $10^6$ cps at room temperature; melting the phase change ink inside the ink jet printing apparatus; and causing droplets of the melted ink to be ejected onto a substrate to form an image.

BRIEF DESCRIPTION OF THE DRAWINGS

For a better understanding of the present embodiments, reference may be had to the accompanying figures.

FIG. 5 is a graph illustrating rheology properties of an alternative solid ink made according to the present embodiments.

Figure 1:
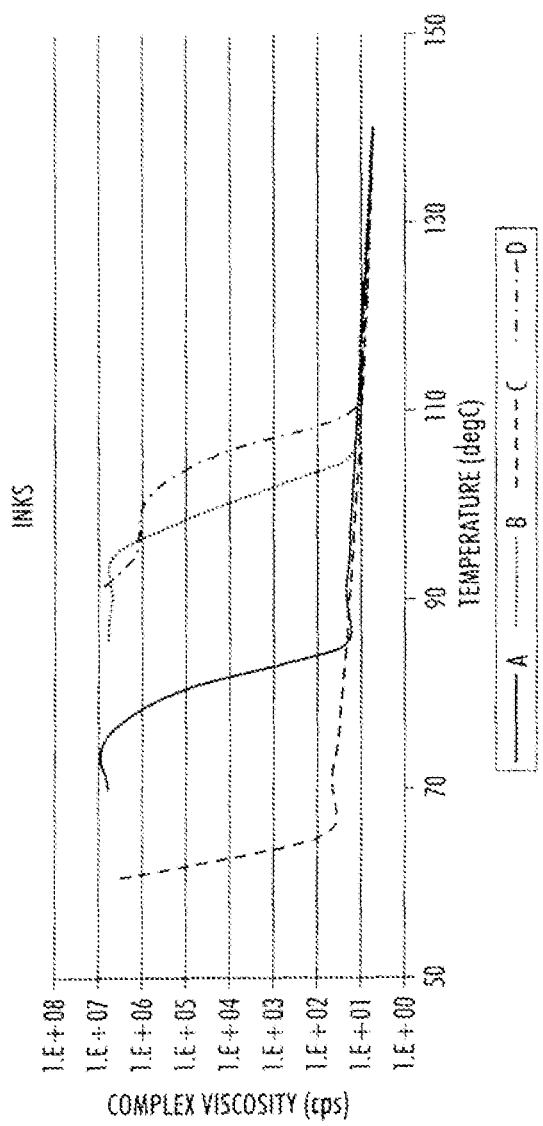
FIG. 1 is a graph illustrating complex viscosity versus temperature for the solid inks made according to the present embodiments.
Figure 2:
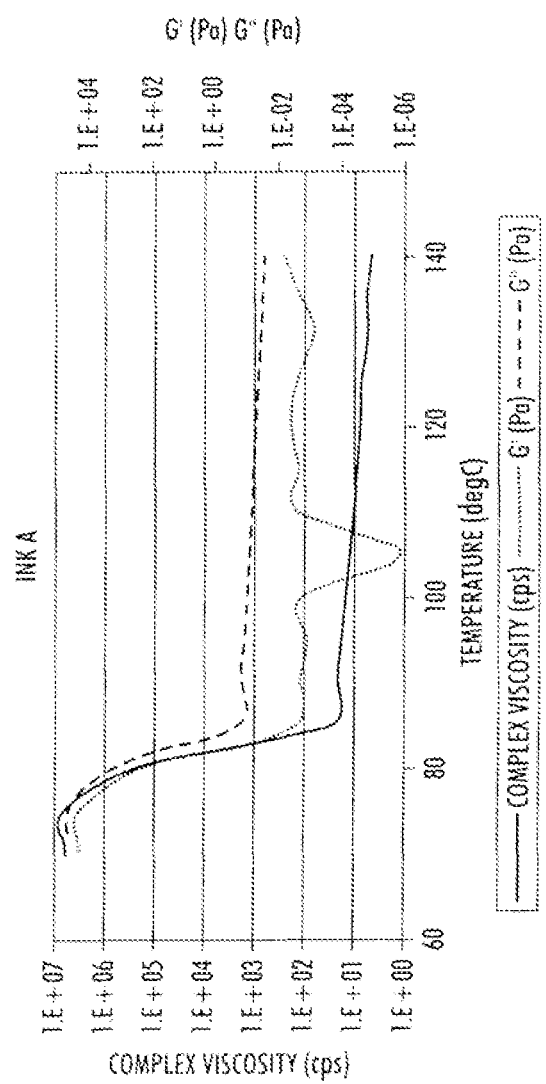
FIG. 2 is a graph illustrating rheology properties of a solid ink made according to the present embodiments.
Figure 3:
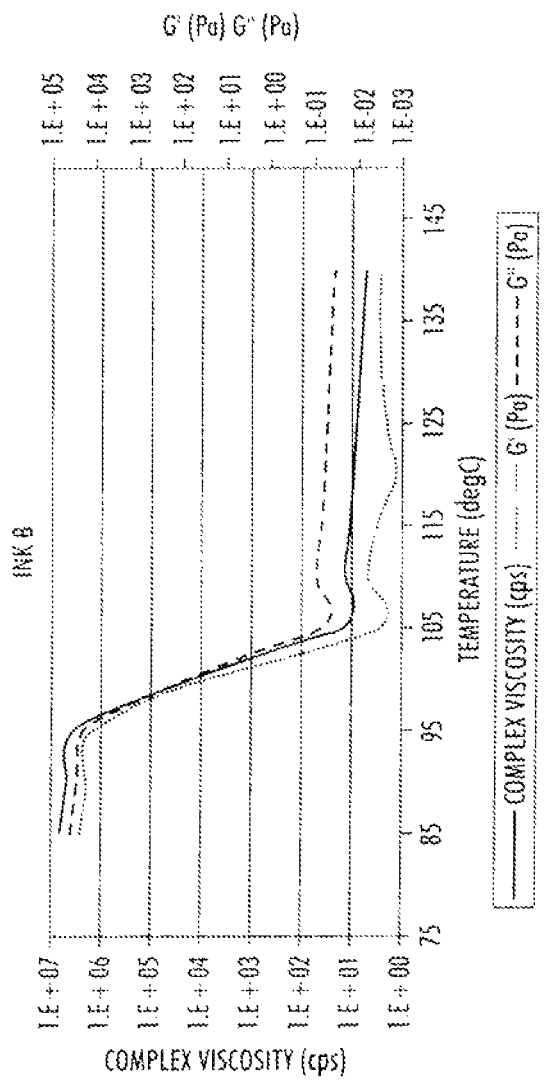
FIG. 3 is a graph illustrating rheology properties of an alternative solid ink made according to the present embodiments.
Figure 4:
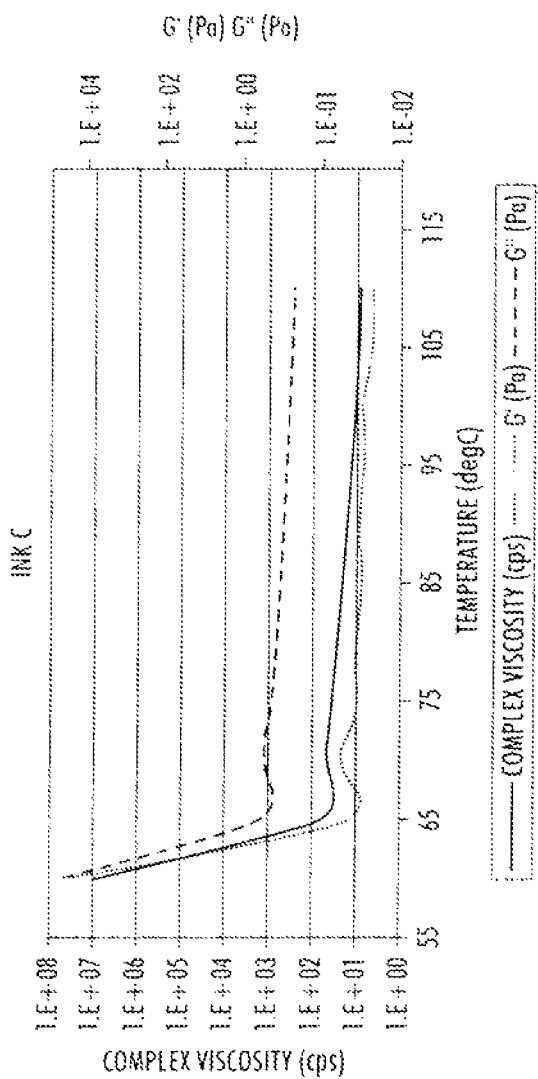
FIG. 4 is a graph illustrating rheology properties of an alternative solid ink made according to the present embodiments.

All of the rheology measurements were made on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

DETAILED DESCRIPTION

In the following description, it is understood that other embodiments may be utilized and structural and operational changes may be made without departure from the scope of the present embodiments disclosed herein.

Solid ink technology broadens printing capability and customer base across many markets, and the diversity of printing applications will be facilitated by effective integration of printhead technology, print process and ink materials. The solid ink compositions are characterized by being solid at room temperature (e.g., 20-27° C.) and molten at an elevated temperature at which the molten ink is applied to a substrate. As discussed above, while current ink options are successful for porous paper substrates, these options are not always satisfactory for coated paper substrates.

It has been discovered that using a mixture of crystalline and amorphous components in solid ink formulations provides robust inks, and in particular, solid inks which demonstrate robust images on coated paper. Crystalline materials refer to those materials which exhibit melting and crystallization peaks by differential scanning calorimetry (DSC). Amorphous materials, in contrast, exhibit no melting and crystallization peaks, only glass transition temperature ($T_g$) or glass transition temperatures. Using a mixture of these materials is surprising, however, due to the known properties of crystalline or amorphous materials. For crystalline materials, small molecules generally tend to crystallize when solidifying and low molecular weight organic solids are generally crystals. While crystalline materials are generally harder and more resistant, such materials are also much more brittle, so that printed matter made using a mainly crystalline ink composition is fairly sensitive to damage. For amorphous materials, high molecular weight amorphous materials, such as polymers, become viscous and sticky liquids at high temperature, but do not show sufficiently low viscosity at high temperatures. As a result, the polymers cannot be jetted from print head nozzles at desirable jetting temperature ($\leq 140°$ C.). In the present embodiments, however, it is discovered that a robust solid ink can be obtained through a blend of crystalline and amorphous components.

The present embodiments provide a new type of solid ink composition which comprises a blend of (1) crystalline and (2) amorphous components, generally in a weight ratio of from about 60:40 to about 95:5, respectively. In more specific embodiments, the weight ratio of the crystalline to amorphous component is from about 65:35 to about 95:5, or is from about 70:30 to about 90:10. In one embodiment, the weight ratio is 70:30. In another embodiment, the weight ratio is 80:20. In general embodiments, the crystalline component comprises 60 percent or more by weight of the total weight of the solid ink. In general embodiments, the amorphous component comprises 5 percent or more by weight of the total weight of the solid ink.

The crystalline component imparts hardness to the inks, cuts the tackiness of the amorphous resin and drives the phase change of the ink through rapid crystallization on cooling. The amorphous resin is designed to give the ink flexibility and toughness, as well as bind the other materials in the ink together. The amorphous materials used in the present embodiments are based upon small branched molecules.

The crystalline component in the ink formulation drives the phase change through rapid crystallization on cooling. The crystalline component also sets up the structure of the final ink film and creates a hard ink by reducing the tackiness of the amorphous component. These materials show no crystallization, relatively low viscosity when molten ($\leq 10^1$ centipoise (cps), or from about 0.5 to about 10 cps, or from about 1 to about 10 cps, or from about 1.5 to about 9 cps) at about 140° C. and high viscosity ($>10^6$ cps) at room temperature. Because the crystalline components dictate the phase change of the ink, rapid crystallization is required to allow further immediate print processing if required (i.e., spreading, duplex printing, etc.) and to prevent excessive showthrough on uncoated substrates. By differential scanning calorimetry (DSC) (10° C.,min from −50 to 200 to −50° C.), desirable crystalline components show sharp crystallization and melting peaks, and the $\Delta T$ ($T_{melt}-T_{crys}$) is less than 55° C. The phase transition temperature of the crystalline component generally occurs between 70 and 130° C. The melting point must be below 150° C., which is the upper limit of the jetting temperature, or preferably below about 145° C., or below about 140° C. The melting point is preferably above 65° C. to prevent blocking and print transfer upon standing at temperatures up to 65° C., or more preferably above about 66° C., or above about 67° C. Examples of suitable crystalline materials are illustrated in Table 1.

TABLE 1

| Compound | Structure | $T_{melt}$ (°C.)* | $T_{crys}$ (°C.)* | ΔT (°C.) | η @ 140° C. (cps)** | η @ RT (cps)** |
|---|---|---|---|---|---|---|
| 1 | (structure: diphenethyl tartrate diester with OH groups) | 110 | 83 | 27 | 4.7 | >10$^6$ |
| 2 | (structure: N-phenethyl 3-phenylpropanamide) | 98 | 71 | 27 | 2.9 | >10$^6$ |
| 3 | (structure: bis(4-methoxyphenyl) heptanedioate) | 119 | 80 | 39 | 3.3 | >10$^6$ |
| Target | | >140° C. | >65° C. | ≤55° C. | <10 cps | >10$^6$ cps |

*The samples were measured on a Q1000 Differential Scanning Calorimeter (TA Instruments) at a rate of 10° C./min from −50° C. to 200° C. to −50° C.; midpoint values are quoted.
**The samples were measured on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

The amorphous components provide tackiness and impart robustness to the printed ink. In the present embodiments, desirable amorphous materials have relatively low viscosity (<10$^2$ cps, or from about 1 to about 100 cps, or from about 5 to about 95 cps, or from about 10 to about 90 cps) at about 140° C., but very high viscosity (about >10$^6$ cps) at room temperature. Generally, the viscosity of the amorphous components is greater than 10$^6$ cps at a temperature of below 40° C. The low viscosity at about 140° C. provides wide formulation latitude while the high viscosity at room temperature imparts robustness. The amorphous materials have $T_g$s but do not exhibit crystallization and melting peaks by DSC (10° C./min from −50 to 200 to −50° C.). The $T_g$ values are typically from about 10 to about 50° C., or from about 10 to about 45° C., or from about 10 to about 40° C., or from about 10 to about 35° C., to impart the desired toughness and flexibility to the inks. The selected amorphous materials have low molecular weights, such as less than 1000 g,mol, or from about 100 to about 1000 g,mol, or from about 200 to about 1000 g,mol, or from about 300 to about 1000 g,mol. Higher molecular weight amorphous materials such as polymers become viscous and sticky liquids at high temperatures, but have viscosities that are too high to be jettable with piezoelectric printheads at desirable temperatures. Examples of suitable amorphous materials are illustrated in Table 2.

TABLE 2

| Compound | Structure | $T_g$ (°C.)* | η @ 140° C.** | MW (g/mol) |
|---|---|---|---|---|
| 4 | (structure: dimenthyl tartrate) | 19 | 10 | 426.59 |

TABLE 2-continued

| Compound | Structure | $T_g$ (°C.)* | η @ 140° C.** | MW (g/mol) |
|---|---|---|---|---|
| 5 | | 18 | 10 | 426.59 |
| 6 | | 13 | 10 | 426.59 |
| 7 | | 11 | 27 | 606.87 |
| Target | | 10-50° C. | <100 cps | <1000 g/mol |

*The samples were measured on a Q1000 Differential Scanning Calorimeter (TA Instruments) at a rate of 10° C./min from −50° C. to 200° C. to −50° C.; midpoint values are quoted.
** The samples were measured on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

In further embodiments, the resulting ink has a viscosity of from about 1 to about 15 cps, or from about 2 to about 14 cps, or from about 3 to about 13 cps at a temperature of about 140° C. At room temperature, the resulting ink has a viscosity of about ≥$10^6$ cps. An increase in viscosity must occur after jetting to control drop spread, allow further immediate print processing if required (i.e., spreading, duplex printing, etc.) and prevent undesirable showthrough on uncoated substrates. The ink viscosity typically changes from between about 10 to 12 cps at jetting to between about $10^5$ to $10^7$ cps or higher at a temperature between about 65 and 130° C., which is referred to as the phase transition. The storage or elastic modulus, G', of the inks of the present embodiments is very low before the phase transition, from about $10^{-1}$ to about $10^{-8}$ Pa, or from about $10^{-2}$ to about $10^{-7}$ Pa, or from about $10^{-3}$ to about $10^{-6}$ Pa, and increases to values ranging from $10^2$ to $10^6$ Pa, or from about $10^3$ to about $10^5$ Pa, or from about $10^4$ to about $10^5$ Pa after phase transition. FIG. 1 illustrates the shape of the log complex viscosity plotted against temperature of four different solid inks made according to the present embodiments. As shown, it is desirable that the slope of the curve in the area before phase transition to be low to allow latitude for jetting temperature. It is desirable to have a sharp and steep transition to high viscosity to control drop spread, allow further immediate print processing if required (i.e., spreading, duplex printing, etc.) and prevent undesirable showthrough on uncoated substrates, as reflected in the slope of the curve shown in FIG. 1. Absolute values of the slope of 0.2 to 0.4° C.$^{-1}$ or higher are desired. Once high viscosity is reached, the slope of the log complex viscosity should decrease, and can be as low as the slope in the jetting region.

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis (4-(2-(3,5-di-tert-butyl-4-hydroxyhydrocinnamoyloxy)) ethoxyphenyl)propane(TOPANOL-205, available from Vertellus); tris(4-tert-butyl-3-hydroxy-2,6-dimethyl benzyl) isocyanurate (Aldrich); 2,2'-ethylidene bis(4,6-di-tert-butylphenyl)fluoro phosphonite (ETHANOX-398, available from Albermarle Corporation); tetrakis(2,4-di-tert-butylphenyl) -4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-tri-fluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis (trifluoromethyl) benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

In further embodiments, the solid ink may optionally contain colorants such as dyes or pigments. The ink of the present embodiments can thus be one with or without colorants. The colorants can be either from the cyan, magenta, yellow, black (CMYK) set or from spot colors obtained from custom color dyes or pigments or mixtures of pigments. Any desired or effective colorant can be employed in the phase change ink compositions, including dyes, pigments, mixtures thereof, and the like, provided that the colorant can be dissolved or dispersed in the ink carrier and is compatible with the other ink components. Dye-based colorants are miscible with the ink base composition, which comprises the crystalline and amorphous components and any other additives.

In embodiments, the phase change ink compositions described herein also include a colorant. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapdn Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (CA. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade By); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic or inorganic materials. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

In embodiments, the inks have a viscosity of about 1 cps to about 15 cps, such as from about 2 cps to about 14 cps, or from about 3 cps to about 13 cps, at a temperature of about 140° C.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature.

An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of the Solid Ink

Amorphous and crystalline materials were synthesized. The chemical structures and properties of interest are shown in Table 1 (Crystalline Components) and Table 2 (Amorphous Components).

To allow efficient jetting, the ink formulations must be homogeneous in the melt. Therefore, the amorphous and crystalline materials must be miscible when molten and the crystalline component must not phase separate upon standing at the jetting temperature for long periods of time. Through experiment, with the materials described above, a preferred ratio of the crystalline to amorphous components was about 65:35 to about 95:5 (w,w), respectively, although higher or slightly lower levels of crystalline material are possible. Depending on the specific crystalline and amorphous components used, optimal performance is expected when the ratio is between about 65:35 to about 95:5 (w,w), respectively.

Several inks were formulated by melt mixing crystalline and amorphous components, as illustrated in Tables 3A and 3B. All of the rheology measurements were made on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

TABLE 3A

| Component | Structure | Ink, wt % | | | |
|---|---|---|---|---|---|
| | | A | B | C | D |
| 1[i] | | 70 | 80 | | |
| 2[ii] | | | | 70 | |
| 3[iii] | | | | | 70 |
| 6[iv] | | 30 | 20 | | |
| 7[v] | | | | 30 | 30 |

[i]Synthesized as described in co-pending U.S. patent application Ser. No. __ (Attorney Docket No. 20101141-390607).
[ii]Synthesized as described in co-pending U.S. patent application Ser. No. __ (Attorney Docket No. 20101142-390608).
[iii]Synthesized as described in co-pending U.S. patent application Ser. No. __ (Attorney Docket No. 20101094-390676).
[iv]Synthesized as described in co-pending U.S. patent application Ser. No. __ (Attorney Docket No. 20101140-390605).
[v]Synthesized as described in co-pending U.S. patent application Ser. No. __ (Attorney Docket No. 20100868-388982).

TABLE 3B

| Properties | Inks | | | |
|---|---|---|---|---|
| | A | B | C | D |
| η at 140° C. (cps) | 5.2 | 6.0 | 4.1 | 5.7 |
| η at RT (cps) | >$10^6$ | >$10^6$ | >$10^6$ | >$10^6$ |
| $T_{jet}$ = 11 cps (° C.)[vi] | 110 | 115-120 | 105 | 115 |
| $T_{phase\ transition}$ (° C.)[vii] | 85 | 105 | 65 | 110 |
| $G'_{min}$ (Pa)[viii] | $1.5 \times 10^{-6}$ | $1.7 \times 10^{-3}$ | $5.3 \times 10^{-4}$ | $1.8 \times 10^{-4}$ |
| $G'_{max}$ (Pa)[ix] | $1.9 \times 10^4$ | $2.4 \times 10^4$ | $3.5 \times 10^4$ | $4.7 \times 10^4$ |
| Slope of phase transition (Δ log complex viscosity/Δ T, ° C.$^{-1}$), (absolute value)[x] | 0.8 | 0.6 | 1.0 | 0.7 |

[vi] Approximate temperature at which the viscosity of the ink is 11 cps.
[vii] Last temperature measurement before which the viscosity increases by a factor of at least about 100 (i.e., phase change).
[viii] Minimum G' value before phase change occurs (see note vii above); $G'_{min}$ occurs between $T_{phase\ transition}$ and 140° C.
[ix] Maximum G' value after phase change occurs (see note vii above); $G'_{max}$ occurs between $T_{phase\ transition}$ and room temperature.
[x] Absolute value of the slope of Δ log complex viscosity as a function of temperature for the phase change (see note vii above).

As shown in FIG. 1, the shape of the log complex viscosity plotted against temperature of the four prepared inks are illustrated.

In embodiments, the target values for the transition phase of the desired solid inks occurs at a temperature between about 65 and about 130° C. and the temperature where viscosity is about 11 cps ($T_{jet}$) is between about 100 and about 140° C. In such embodiments, the target values for $G'_{min}$ is from about $10^{-2}$ to about $10^{-7}$ Pa and $G'_{max}$ is from about $10^3$ to about $10^5$ Pa, and the absolute value of the slope phase transition (Δlog complex viscosity,ΔT) is greater than 0.2° C.$^{-1}$.

Analysis of Inks A-D demonstrated that the above target values were all met. For example, the transition phase of the Inks A-D occurred at temperatures between about 65 and about 110° C. and the temperatures at which the viscosity was about 11 cps ($T_{jet}$) were from about 105 to about 120° C. In addition, the values for $G'_{min}$ for solid Inks A-D were from about $10^{-3}$ to about $10^{-6}$ Pa and $G'_{max}$ for solid Inks A-D were from about $10^4$ to about $10^5$ Pa, with the slope phase transition (Δlog complex viscosity,ΔT) being from 0.6 to about 1.0° C.$^{-1}$.

Summary

The present embodiments provide solid ink formulations developed for inkjet printing which contains at least one crystalline material and at least one amorphous material, and optionally a colorant. The present embodiments provide robust solid inks which are suitable for application to a variety of substrates, including coated substrates.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants,patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink comprising:
   at least a crystalline component having a viscosity of less than 10 cps at 140° C. and a viscosity of greater than $1 \times 10^6$ cps at room temperature; and
   at least an amorphous component that is different from the crystalline component and having a viscosity of less than 100 cps at 140° C. and a viscosity of greater than $1 \times 10^6$ cps at room temperature, wherein the phase change ink has a viscosity of less than 12 cps at 140° C. and a viscosity of at least $1 \times 10^6$ cps at room temperature.

2. The phase change ink of claim 1 having a viscosity of less than 11 cps at 140° C. and a viscosity of at least $10^6$ cps at a temperature between 20 and 27° C.

3. The phase change ink of claim 1 having a phase transition at a temperature between 65 and 130 ° C.

4. The phase change ink of claim 3 having a phase transition at a temperature between 65 120 ° C.

5. The phase change ink of claim 1, wherein viscosity of the phase change ink increases to at least $10^5$ cps at a temperature below 65 ° C.

6. The phase change ink of claim 5, wherein viscosity of the phase change ink increases to at least $10^6$ cps at a temperature of below 65 ° C.

7. The phase change ink of claim 1 having an elastic modulus $G'_{min}$ of from $10^{-2}$ to $10^{-8}$ Pa when the phase change ink is a liquid.

8. The phase change ink of claim 7 having an elastic modulus $G'_{min}$ of from $10^{-3}$ to $10^{-7}$ Pa when the phase change ink is a liquid.

9. The phase change ink of claim 1 having an elastic modulus $G'_{max}$ of from $10^2$ to $10^6$ Pa when the phase change ink is a solid.

10. The phase change ink of claim 9 having an elastic modulus $G'_{max}$ of from $10^3$ to $10^5$ Pa when the phase change ink is a solid.

11. The phase change ink of claim 1, wherein the absolute value of the slope of phase transition (Δlog complex viscosity/ΔT) is equal to or greater than 0.2 ° C$^{-1}$.

12. The phase change ink of claim 1, wherein the crystalline component comprises 60 percent or more by weight of the total weight of the phase change ink.

13. The phase change ink of claim 1, wherein the amorphous component comprises 5 or more percent by weight of the total weight of the phase change ink.

14. The phase change ink of claim 1, wherein the crystalline and amorphous components are blended in a weight ratio of from 60:40 to 95:5.

15. The phase change ink of claim 14, wherein the crystalline and amorphous components are blended in a weight ratio of from 65:35 to 90:10.

16. The phase change ink of claim 1 further comprising a colorant selected from the group consisting of a pigment, dye or mixtures thereof.

17. A phase change ink comprising:
   at least a crystalline component; and
   at least an amorphous component, wherein the phase change ink has a viscosity of less than 12 cps at a temperature of 140° C. and a viscosity of at least $10^6$ cps at room temperature.

18. A method of printing, comprising:
   incorporating a phase change ink into an ink jet printing apparatus, wherein the phase change ink comprises,
      at least a crystalline component having a viscosity of less than 10 cps at 140° C. and a viscosity of greater than $1 \times 10^6$ cps at room temperature; and
      at least an amorphous component that is different from the crystalline component and having a viscosity of less than 100 cps at 140° . and a viscosity of greater than $1 \times 10^6$ cps at room temperature, wherein the phase change ink has a viscosity less than 12cps at a temperature of 140° C. and a viscosity of at least $1\times10^6$ cps at room temperature;

melting the phase change ink inside the ink jet printing apparatus; and causing droplets of the melted ink to be ejected onto a substrate to form an image.

19. The method of claim 18, wherein the substrate is a final recording sheet and droplets of the melted ink are ejected in an imagewise pattern directly onto the final recording sheet.

20. The method of claim 18, wherein the substrate is an intermediate transfer member and droplets of the melted ink are ejected in an imagewise pattern onto the intermediate transfer member followed by transfer of the imagewise pattern from the intermediate transfer member to a final recording sheet.

* * * * *